United States Patent
Chen et al.

(10) Patent No.: US 11,656,199 B2
(45) Date of Patent: May 23, 2023

(54) SYSTEM AND METHOD FOR OBTAINING AND ANALYZING FLUX LEAKAGE DATA IN THE INSPECTION OF OIL AND GAS WELLS

(71) Applicant: SCHLUMBERGER TECHNOLOGY CORPORATION, Sugar Land, TX (US)

(72) Inventors: Yong-Hua Chen, Belmont, MA (US); Dzevat Omeragic, Lexington, MA (US); Tarek M. Habashy, Burlington, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 17/253,775

(22) PCT Filed: Jun. 19, 2019

(86) PCT No.: PCT/US2019/037922
§ 371 (c)(1),
(2) Date: Dec. 18, 2020

(87) PCT Pub. No.: WO2019/246212
PCT Pub. Date: Dec. 26, 2019

(65) Prior Publication Data
US 2021/0285915 A1    Sep. 16, 2021

Related U.S. Application Data

(60) Provisional application No. 62/690,123, filed on Jun. 26, 2018, provisional application No. 62/686,873, filed on Jun. 19, 2018.

(51) Int. Cl.
*G01N 27/83* (2006.01)
*E21B 47/00* (2012.01)
(Continued)

(52) U.S. Cl.
CPC ............ *G01N 27/83* (2013.01); *E21B 47/006* (2020.05); *E21B 47/092* (2020.05); *G01M 3/04* (2013.01)

(58) Field of Classification Search
CPC ..... G01N 27/83; E21B 47/092; E21B 47/006; G01M 3/04
See application file for complete search history.

(56) References Cited

U.S. PATENT DOCUMENTS

| 3,940,689 A | 2/1976 | Johnson, Jr. |
| 6,924,640 B2 | 8/2005 | Fickert et al. |

(Continued)

FOREIGN PATENT DOCUMENTS

| CN | 101865883 A | * | 10/2010 |
| CN | 104502442 A | * | 4/2015 |
| JP | H08145952 A | * | 6/1996 |

OTHER PUBLICATIONS

Ravan, Amineh, Koziel, Nikolova, and Reilly, "Sizing of 3-D Arbitrary Defects Using Magnetic Flux Leakage Measurements", IEEE Transactions on Magnetics, Apr. 2010 (Year: 2010).*

(Continued)

*Primary Examiner* — Natalie Huls
*Assistant Examiner* — Cynthia L Davis
(74) *Attorney, Agent, or Firm* — Ashley E. Brown

(57) ABSTRACT

Embodiments of the present disclosure are directed towards a method for obtaining and analyzing flux leakage data. Embodiments may include measuring, using a magnetic flux leakage tool, magnetic flux leakage data from a casing and determining sensor liftoff data from the flux leakage data. Embodiments may also include performing outward analytic continuation of the magnetic flux leakage data from a sensor plane to one or more additional planes and extrapolating back from the one or more additional planes to a surface. Embodiments may include applying a model-based para- (Continued)

metric inversion to the magnetic field flux leakage data and determining, based upon, at least in part, the model-based parametric inversion, a shape and size of a corresponding corroded area associated with the casing.

12 Claims, 12 Drawing Sheets

(51) Int. Cl.
    *E21B 47/092*     (2012.01)
    *G01M 3/04*     (2006.01)

(56) References Cited

U.S. PATENT DOCUMENTS

| | | | |
|---|---|---|---|
| 2003/0189427 A1* | 10/2003 | Oristaglio | G01V 3/10 324/67 |
| 2005/0001612 A1 | 1/2005 | Buttle | |
| 2016/0161448 A1 | 6/2016 | Huang et al. | |
| 2016/0178580 A1 | 6/2016 | Huang et al. | |
| 2016/0238514 A1 | 8/2016 | Denenberg et al. | |
| 2016/0274060 A1 | 9/2016 | Denenberg et al. | |
| 2018/0275099 A1* | 9/2018 | Huang | G06F 30/20 |

OTHER PUBLICATIONS

Braunisch, H. et al., "Deblurring by a local extrapolation scheme", Inverse Problems, 1999, 15, pp. 1263-1281.

Habashy, T. et al., "A General Framework for Constraint Minimization for the Inversion of Electromagnetic Measurements", Progress in Electromagnetics Research, 2004, 46, pp. 265-312.

Shaar, M. A. et al., "High Resolution Casing Imaging Utilizing Magnetic Flux Leakage Measurements", SPWLA 49th Annual Logging Symposium, Edinburgh, Scotland, May 2008, 10 pages.

Vogtsberger, D. C. et al., "Development of High-Resolution Axial Flux Leakage Casing-Inspection Tools", SPE 97807, presented at the SPE Eastern Regional Meeting, Morgantown, West Virginia, U.S.A., 2005, 8 pages.

Search Report and Written Opinion of International Patent Application No. PCT/US2019/037922 dated Oct. 2, 2019, 12 pages.

International Preliminary Report on Patentability of International Patent Application No. PCT/US2019/037922, dated Dec. 30, 2020, 9 pages.

* cited by examiner

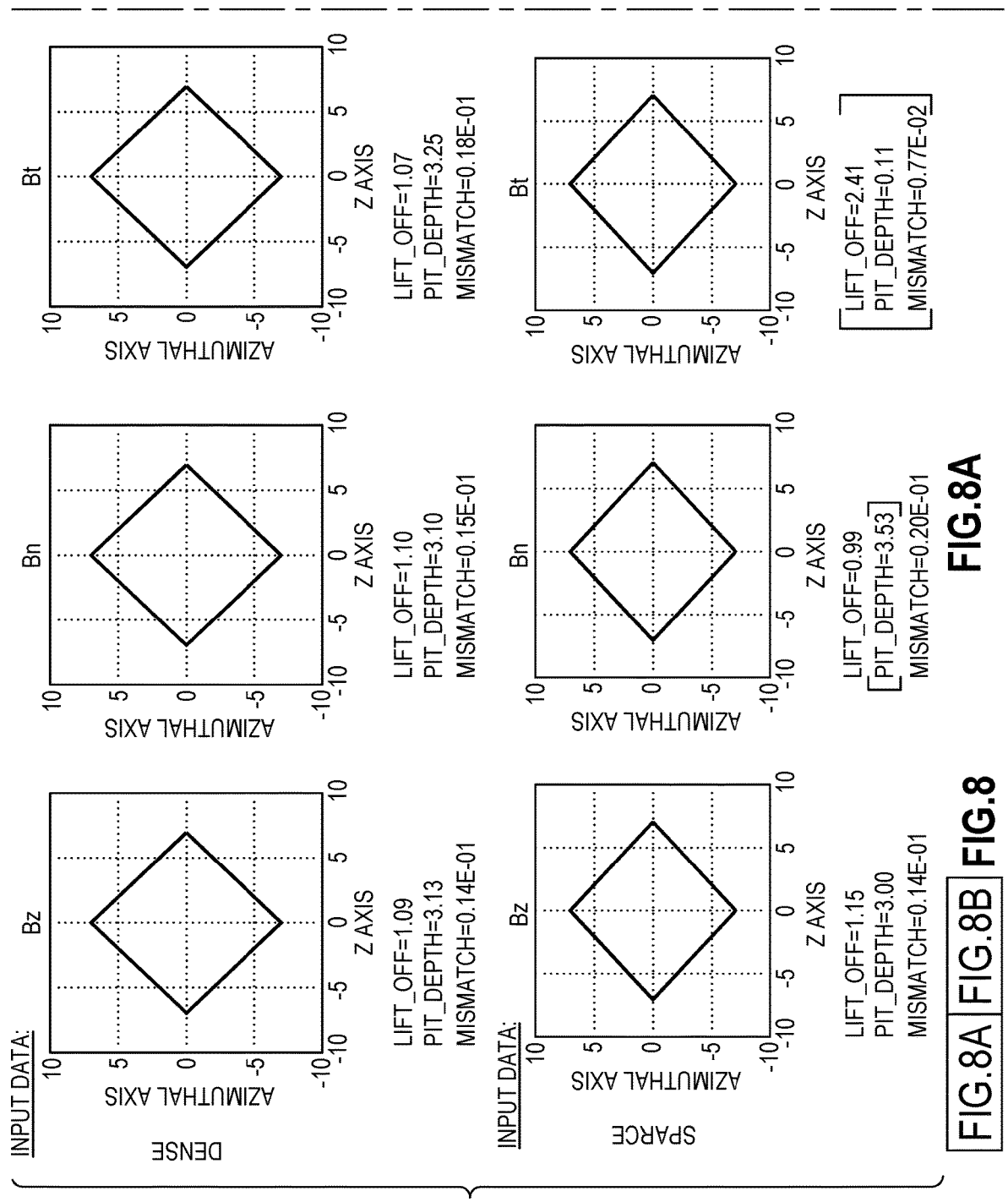

| FIELD USED | | Bz | | | Bn | | | Bt | | | Bz & Bn | | | Bz & Bt | | | Bn & Bt | | | Bz, Bn & Bt | | |
|---|---|---|---|---|---|---|---|---|---|---|---|---|---|---|---|---|---|---|---|---|---|---|
| PIT DEPTH (mm) | | INVERTED LIFTOFF (1mm) | PIT DEPTH (VARY) | MISMATCH (%) | INVERTED LIFTOFF (1mm) | PIT DEPTH (VARY) | MISMATCH (%) | INVERTED LIFTOFF (1mm) | PIT DEPTH (VARY) | MISMATCH (%) | INVERTED LIFTOFF (1mm) | PIT DEPTH (VARY) | MISMATCH (%) | INVERTED LIFTOFF (1mm) | PIT DEPTH (VARY) | MISMATCH (%) | INVERTED LIFTOFF (1mm) | PIT DEPTH (VARY) | MISMATCH (%) | INVERTED LIFTOFF (1mm) | PIT DEPTH (VARY) | MISMATCH (%) |
| 1 | | 1.72 | 0.05 | 6.7 | 1.56 | 0.15 | 9.1 | 1.50 | 0.12 | 0.25 | [1.43] | 0.54 | 8.6 | [1.69] | 0.09 | 4.9 | 1.10 | [1.24] | 6.2 | 1.02 | [1.64] | 6.9 |
| 2 | | 1.93 | 0.14 | 3.1 | [0.82] | 3.11 | 4.1 | 2.93 | 0.16 | 6.7 | 1.13 | 2.14 | 4.2 | 1.38 | 1.49 | 2.2 | 1.12 | 2.1 | 3.2 | [1.21] | 1.90 | 3.5 |
| 3 | | 1.15 | 3.00 | 0.14 | 0.99 | [3.53] | 2.0 | [2.41] | 0.11 | 0.77 | 1.08 | 3.22 | 0.19 | 1.19 | 2.80 | 1.0 | 1.07 | 3.17 | 1.5 | 1.12 | 303 | 1.6 |
| 4 | | 1.09 | 4.07 | 0.69 | 1.02 | 4.33 | 0.97 | [3.55] | 0.11 | 5.7 | 1.06 | 4.17 | 0.94 | 1.09 | 4.08 | 0.51 | 1.05 | 4.21 | 0.72 | 1.07 | 4.16 | 0.77 |
| 6 | | 1.03 | 6.23 | 0.2 | 1.06 | 5.99 | 0.52 | [1.38] | 5.05 | 0.78 | 1.02 | 6.32 | 0.21 | 1.03 | 6.26 | 0.13 | 1.02 | 6.32 | 0.16 | 1.02 | 6.32 | 0.17 |
| 9 | | 1.00 | 9.43 | 0.16 | 1.01 | 9.25 | 0.15 | 4.18 | 0.21 | 3.7 | 1.01 | 9.35 | 0.05 | 1.01 | 9.33 | 0.06 | 1.01 | 9.30 | 1 | 1.01 | 9.32 | 0.07 |
| 12 | | 1.01 | 12.2 | 0.19 | 1.01 | 12.8 | 0.18 | 1.09 | 11.8 | 0.33 | 1.00 | 12.4 | 0.05 | 1.01 | 12.3 | 0.12 | 1.01 | 12.3 | 0.11 | 1.01 | 12.3 | 0.09 |

FIG.9

SYSTEM AND METHOD FOR OBTAINING AND ANALYZING FLUX LEAKAGE DATA IN THE INSPECTION OF OIL AND GAS WELLS

CROSS-REFERENCE TO RELATED APPLICATIONS

This application claims the benefit of U.S. Provisional Application No. 62/686,873, filed on 19 Jun. 2018 and U.S. Provisional Application No. 62/690,123, filed on 26 Jun. 2018; the contents of which are incorporated herein by reference.

FIELD

This application relates to systems and methods for inspecting oil and gas well casings.

BACKGROUND

Magnetic flux leakage tools are widely used for high-resolution casing corrosion inspection in oil and gas wells. Flux leakage generally relates to a distortion of the magnetic flux that has been introduced into a casing by an electromagnet or permanent magnet. The principle of magnetic flux leakage is used to detect casing corrosion, since magnetic flux leakage is caused by rapid changes in the thickness of the casing and by pits and holes in either the internal or external wall. Casing defects or corrosion distorts the magnetic-flux lines and induce a signal into magnetic sensor moving past it. In-situ magnetic flux-leakage measurements make use of this effect by placing a magnetic sensor on or close to the casing wall, azimuthally distributed to cover the entire wall. The results are often combined with a high-frequency, eddy-current measurement, or magnetostatic sensors designed to detect flaws only on the inner wall.

For a typical magnetic flux leakage tool, an axially polarized permanent magnet or electromagnet is placed at the center of a casing tube to excite a magnetostatic field traversing through and saturating the steel casing. The magnetic flux flow remains undisturbed if the pipe's shape and properties do not vary. Presence of local defects or corroded spots in the pipe disturbs the magnetic flux flow and causes it to leak out of the casing. These leaked magnetic fields typically contain all three field components in the axial, radial or normal, and azimuthal directions. The azimuthal component is produced only when the defect is asymmetric, which is generally the case. In a magnetic flux leakage tool, the leaked magnetic flux is detected by magnetic field sensors placed in the proximity of the pipe surface. Based on this principle, magnetic field sensors are instrumented on pads which are pushed against the inner surface of the pipe to detect the variation of the magnetic field due to possible existence of defects, pits and holes in the pipe. The magnetic field sensor is typically a Hall effect sensor, a GMR (giant magneto-resistive) sensor or may be any other device measuring the magnetic field strength. To cover the whole azimuth of the casing wall, multiple pads are used both azimuthally and axially, with each pad containing an array of azimuthally distributed magnetic field sensors.

The acquired data for casing inspection may include the radial (or normal), the axial, and the azimuthal components of the magnetic fields. These data form 2D images of the pipe wall, with the field variations indicating defects or corroded spots in the pipe. The responses (quality of images) are significantly affected by the liftoff—the gap which inevitably exists between the magnetic sensor and the pipe wall. Little has been done to correct the effect of the sensor liftoff in image processing to improve the quality of the flux leakage measurements and images. The magnetic data processing is performed for each individual field component independently and the evaluation of the defects is generally qualitative.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In some embodiments, a method for improving magnetic flux leakage data to remove a sensor liftoff effect is provided. The method may include measuring, using a magnetic flux leakage tool, magnetic flux leakage data from a casing and determining sensor liftoff data from the magnetic flux leakage data. The method may also include performing outward analytic continuation of the magnetic flux leakage data based on the sensor liftoff information from a sensor plane to one or more additional planes and extrapolating back from the one or more additional planes to a surface.

One or more of the following example features may be included. In some embodiments, extrapolating back may include a linear extrapolation approach and/or a polynomial extrapolation approach. The method may further include determining a magnetic field distribution at zero liftoff. The method may also include integrating a normal component of a magnetic field to determine a shape of a defect. The method may further include displaying the shape of the defect for interpretation. The method may also include applying a deconvolution inversion filter to the magnetic flux leakage data.

In another example implementation, a method for interpreting magnetic flux leakage data is provided. The method may include measuring, using a magnetic flux leakage tool, magnetic field flux leakage data from a casing and applying a model-based parametric inversion approach to the magnetic field flux leakage data. The method may further include determining, based upon, at least in part, the model-based parametric inversion approach, a shape and size of a corresponding corroded area associated with the casing.

One or more of the following example features may be included. The model-based parametric inversion approach may include an analysis of one or more parameters associated with the casing. The shape of the defect can be assumed to be circular, elliptical or polygonal. The one or more parameters may include parameters describing the shape of defects, such as position and radius of the circular defect, position, orientation and radii of elliptical defects, or at least one of nodes of a polygon defining the defect shape, a depth of defect, a casing permeability, and a lift-off distance from a sensor to a surface of the casing. Determining the shape and size of a corresponding corroded area may include using image post-processing using analytical continuation or filtering to obtain an inversion initial estimate corrosion shape, depth, or liftoff.

In some embodiments, a system for improving magnetic flux leakage data to remove a sensor liftoff effect is provided. The system may include a magnetic flux leakage tool including a sensor and at least one processor configured to measure, using a flux leakage tool, magnetic flux leakage data from a casing and to determine sensor liftoff data from the flux leakage data. The at least one processor may be further configured to perform outward analytic continuation of the magnetic flux leakage data based on the sensor liftoff data from a sensor plane to one or more additional planes and to extrapolate back from the one or more additional planes to a surface.

One or more of the following example features may be included. Extrapolating back may include a linear extrapolation approach and/or a polynomial extrapolation approach. The at least one processor may be further configured to determine a magnetic field distribution at zero liftoff and to integrate a normal component of a magnetic field to determine a shape of a defect. The at least one processor may be further configured to visualize the shape of the defect for interpretation. The at least one processor may be further configured to apply a deconvolution inversion filter to the flux leakage data.

In some embodiments, a system for interpreting magnetic flux leakage data is provided. The system may include a magnetic flux leakage tool including a sensor and at least one processor configured to measure, using a magnetic flux leakage tool, magnetic field flux leakage data from a casing and to apply a model-based parametric inversion approach to the magnetic field flux leakage data. The at least one processor may be further configured to determine, based upon, at least in part, the model-based parametric inversion approach, and a shape and size of a corresponding corroded area associated with the casing.

One or more of the following example features may be included. The model-based parametric inversion algorithm may include an analysis of one or more parameters associated with the casing, the one or more parameters including at least one of nodes of a polygon defining the defect, a depth of defect, a casing permeability, and a lift-off distance from a sensor to a surface of the casing.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein:

FIG. 9 shows inversion results for different pit depth with different field components for a diamond-shaped pit in accordance with embodiments of the present disclosure.

DETAILED DESCRIPTION

The discussion below is directed to certain implementations and/or embodiments. It is to be understood that the discussion below may be used for the purpose of enabling a person with ordinary skill in the art to make and use any subject matter defined now or later by the patent "claims" found in any issued patent herein.

It is specifically intended that the claimed combinations of features not be limited to the implementations and illustrations contained herein but include modified forms of those implementations including portions of the implementations and combinations of elements of different implementations as come within the scope of the following claims. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

It will also be understood that, although the terms first, second, etc. may be used herein to describe various elements, these elements should not be limited by these terms. These terms may be used to distinguish one element from another. For example, a first object or step could be termed a second object or step, and, similarly, a second object or step could be termed a first object or step, without departing from the scope of the disclosure. The first object or step, and the second object or step, are both objects or steps, respectively, but they are not to be considered a same object or step.

Figure 1:
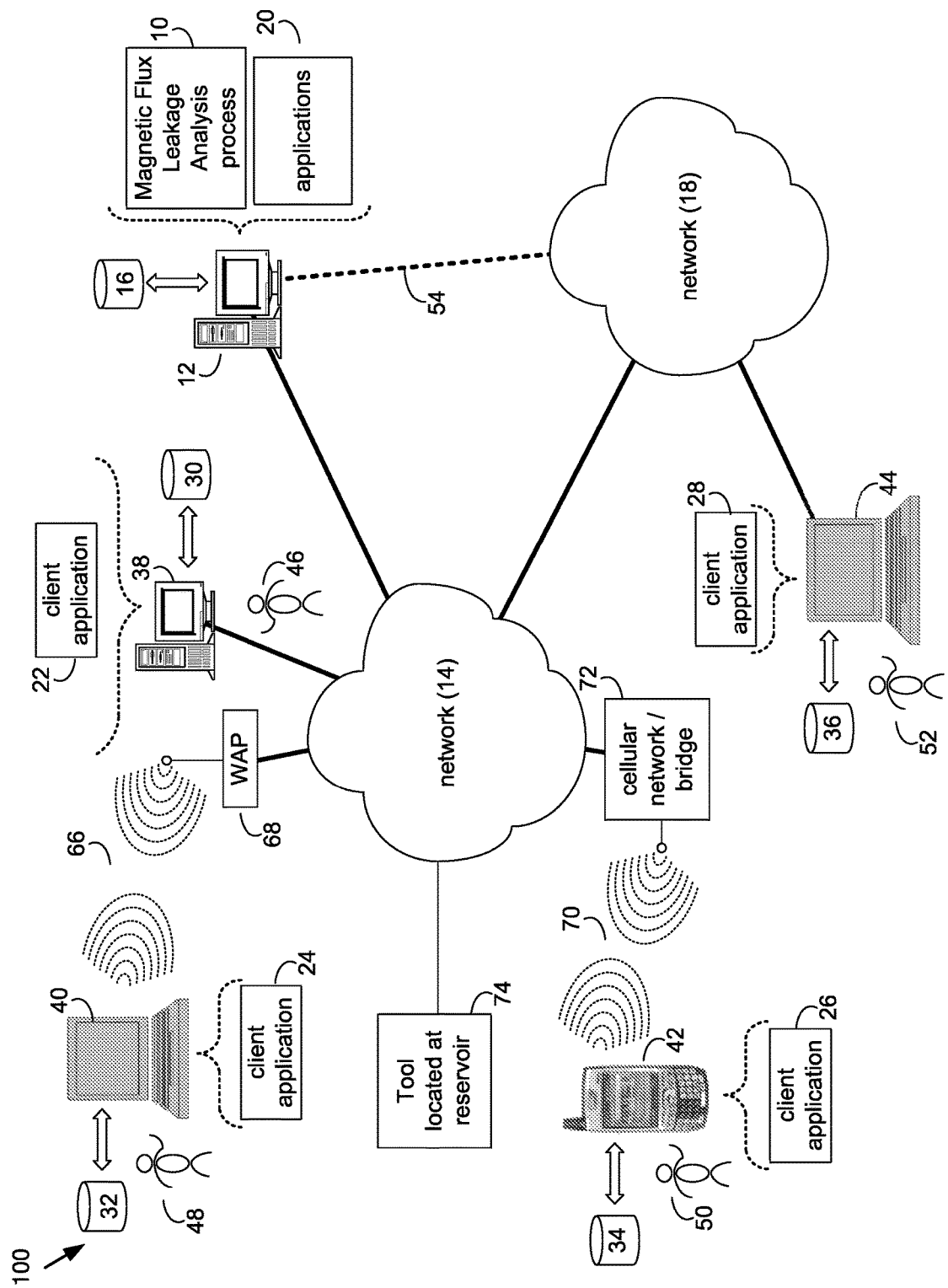
FIG. 1 illustrates a block diagram of a system for a magnetic flux leakage analysis process in accordance with embodiments of the present disclosure.

Referring to FIG. 1, there is shown a magnetic flux leakage analysis process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, magnetic flux leakage analysis process 10 may reside on and be executed, in whole or in part, by a client electronic device, such as a personal computer, notebook computer, personal digital assistant, or the like.

The instruction sets and subroutines of magnetic flux leakage analysis process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid-state drive, a tape drive; an optical drive; a RAID array; a random-access memory (RAM); and a read-only memory (ROM). Storage device 16 may include various types of files and file types.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Magnetic flux leakage analysis process 10 may be a standalone application or may be an applet/application/script that may interact with and/or be executed within application 20. In addition/as an alternative to being a server-side process, magnetic flux leakage analysis process 10 may be a client-side process (not shown) that may reside on a client electronic device (described below) and may interact with a client application (e.g., one or more of client applications 22, 24, 26, 28). Further, magnetic flux leakage analysis process 10 may be a hybrid server-side/client-side process that may interact with application 20 and a client application (e.g., one or more of client applications 22, 24, 26, 28). As such, magnetic flux leakage analysis process 10 may reside, in whole, or in part, on server computer 12 and/or one or more client electronic devices.

The instruction sets and subroutines of application 20, which may be stored on storage device 16 coupled to server computer 12 may be executed by one or more processors (not shown) and one or more memory modules (not shown) incorporated into server computer 12.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access flux leakage analysis process 10.

Users 46, 48, 50, 52 may access flux leakage analysis process 10 and/or other applications associated with server computer 12 directly through the device on which the client application (e.g., client applications 22, 24, 26, 28) is executed, namely client electronic devices 38, 40, 42, 44, for example. Users 46, 48, 50, 52 may access process 10 and/or other applications directly through network 14 or through secondary network 18. Further, server computer 12 (i.e., the computer that executes these applications) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both).

In some embodiments, magnetic flux leakage analysis process 10 may generate an output that may be delivered to one or more onsite tools such as reservoir tool 74. Reservoir tool 74 may include, but is not limited to, those available from the Assignee of the present disclosure. In some embodiments, reservoir tool 74 may include one or more processors configured to receive an output from magnetic flux leakage analysis process 10 and alter the operations of reservoir tool 74.

Embodiments included herein are directed towards methods for removing or reducing sensor liftoff effect and sharpening one or more images for flux leakage tool measurements are described.

Figure 2:
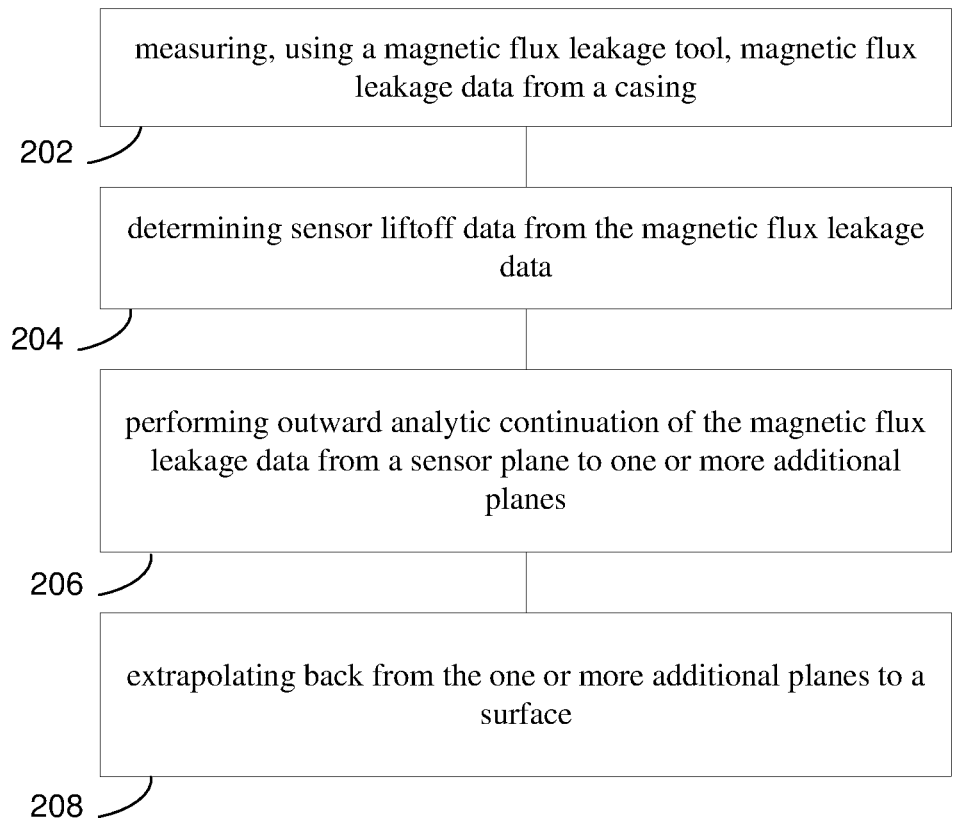
FIG. 2 illustrates a flowchart showing operations consistent with embodiments of the present disclosure.

Referring now to FIG. 2, a flowchart 200 consistent with embodiments of flux leakage analysis process 10 is provided. The method may include measuring (202), using a magnetic flux leakage tool, magnetic flux leakage data from a casing and determining (204) sensor liftoff data from the flux leakage data. The method may also include performing (206) outward analytic continuation of the flux leakage data from a sensor plane to one or more additional planes and extrapolating (208) back from the one or more additional planes to a surface.

Accordingly, embodiments of the present disclosure are directed towards methods to remove or reduce the sensor lift-off effect and sharpen the images for the magnetic flux leakage tool measurements. As discussed below, embodiments included herein may be used to improve the imaging and the interpretation of the magnetic flux leakage logging. As such, the teachings of the present disclosure may be used to remove the effect of the sensor liftoff and bring the measured fields closer to the surface, thus sharpening the images. The first method utilizes analytical continuation of data followed by extrapolation. The second method utilizes data filtering through regularized deconvolution.

Method of Analytical Field Continuation and Extrapolation

Given the measured magnetic flux leakage data $f(\rho, \xi_0)$, where $\xi_0$ is the sensor liftoff, embodiments included herein may be used to obtain the magnetic field distribution $f(\rho)$ at zero liftoff, since the measured data are of highest resolution when closest to the defects or corroded spots in the pipe. The responses at zero liftoff and at the measurement plane are related by the following convolution process:

$$f(\rho,\xi_0)=\int_{-\infty}^{\infty} d\rho' g(\rho-\rho',\xi_0) f(\rho'), \quad (1)$$

where integral kernel $g(\rho-\rho',\xi_0)$ of the convolution is given as $$g(\rho - \rho', \xi_0) = \frac{1}{2\pi} \frac{|\xi_0|}{(|\rho - \rho'|^2 + \xi_0^2)^{3/2}}. \quad (2)$$

To determine $f(\rho)$ from $f(\rho, \xi_0)$, which may be corrupted by measurement noise, one performs Fourier transform on equation (1) with respect to $\rho$ to obtain:

$$F(\omega,\xi_0)=G(\omega,\xi_0)F(\omega), \quad (3a)$$

or $$F(\omega)=F(\omega,\xi_0)/G(\omega,\xi_0). \quad (3b)$$

Applying the inverse Fourier transform to calculate $f(\rho)$ is a highly unstable process since the deconvolution filter given by $$1/G(\omega,\xi_0)=e^{k|\xi_0|}, \quad (4)$$

where $k=|\omega|$, is a growing exponential. In other words, using the inverse of $G(\omega,\xi_0)$ to back-propagate the magnetic field from the measurement plane to the tubular surface would be exponentially growing, leading to an ill-posed and very unstable process due to the inevitable presence of measurement noise.

While the inversion of the integral kernel filter is not stable, forward propagating the data away from the measurement plane has the exact opposite effect and can be exploited to suppress the noise in the measured data. This can be done by first analytically continuing the measured magnetic field $f(\rho,\xi_0)$ to outer plane locations of larger liftoff values $\xi_i (\xi_i > \xi_0, i=1, 2, \ldots M)$:

$$f(\rho,\xi_i)=\int_{-\infty}^{\infty} dp' g(\rho-\rho',\xi_i-\xi_0) f(\rho',\xi_0). \quad (5)$$

The analytical forward continuation of the data, per equation (5), away from the sources (defects) is called outward continuation. See Braunisch, H., and Habashy, T., 1999, Deblurring by a local extrapolation scheme, Inverse Problem, 15, 1263-1281.

It constitutes a straightforward numerical integration of the data and has the effect of smoothing out the data and hence suppressing the high spatial frequency components—mostly the noise in the data.

Figure 3:
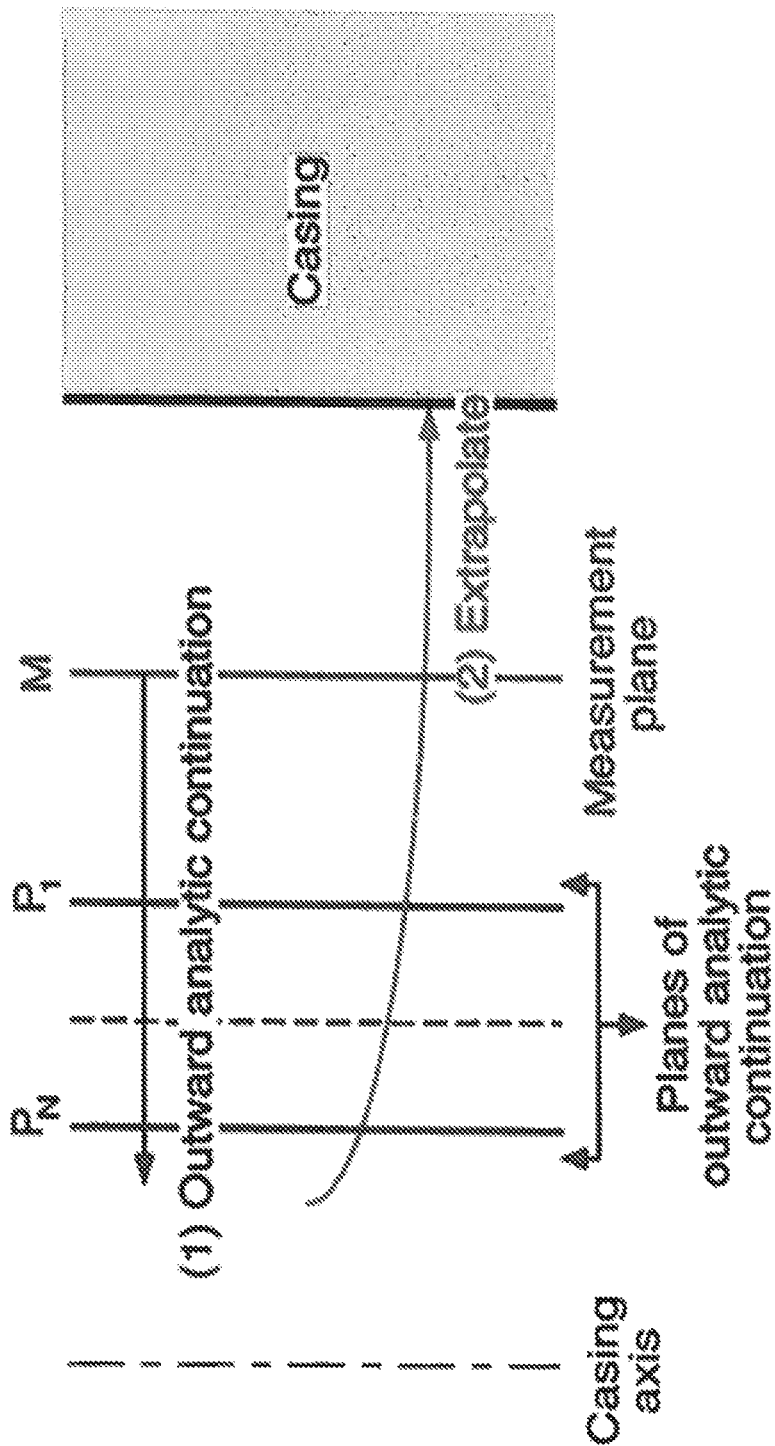
FIG. 3 depicts an example analytical continuation on magnetic flux leakage data in accordance with embodiments of the present disclosure. The outward analytical continuation from the measurement plane M to $P_1 \ldots P_N$ is followed by extrapolation from $P_N \ldots P_1$, M to the casing surface.

The analytical continuation approach is illustrated in FIG. 3. In the first step, the data are continued analytically (outwards) from the measurement plane (M) to the planes $P_1, \ldots P_N$. In the second step, the extrapolation may be performed backward from the planes $P_N, \ldots P_1$, M to the casing surface.

With the multiple outward-continued data sets, it may be possible to extrapolate the magnetic field back to where the sources are assumed to reside by using, for example, a linear or a polynomial extrapolation scheme. Notice that it is not necessary to know the exact liftoff to perform the image processing described above. A proper liftoff value may always be estimated through approximation, trial and error, or through an independent measurement.

Figure 4:
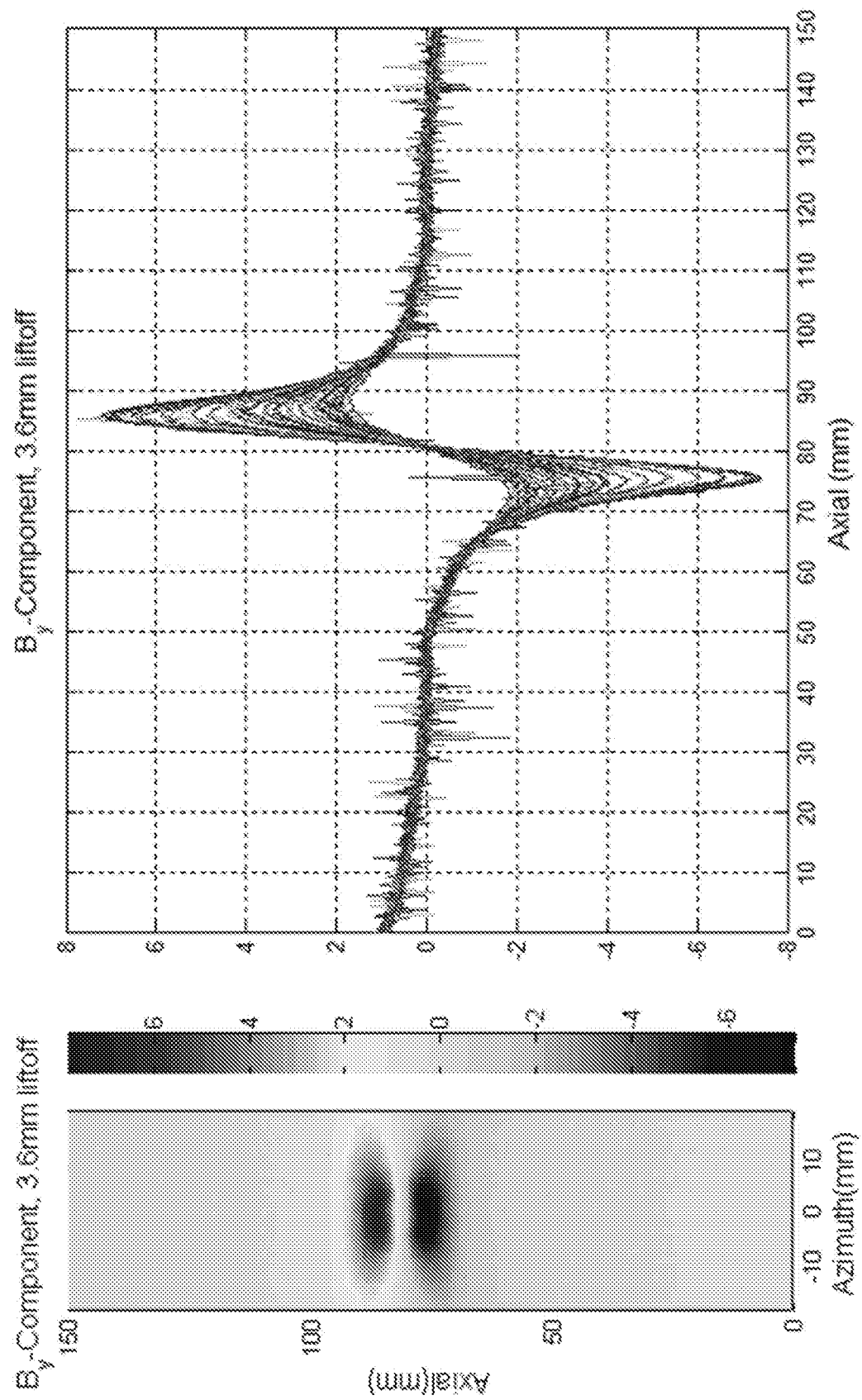
FIG. 4 depicts measured magnetic flux leakage data (radial component, $B_y$) of a 10 mm hole defect in a laboratory in accordance with embodiments of the present disclosure. The sensor liftoff is 3.6 mm.

As an example, the method described above was applied to process an experimental magnetic flux leakage data set, acquired with a liftoff of 3.6 mm, to test the imaging capability for a 10 mm circular hole. The measured radial component of magnetic flux density $B_y$ is shown in FIG. 4. The data may be contaminated by noise and the raw image does not show a clear signature of the circular hole because of the influence of liftoff.

Figures 5A, 5B, 5C:
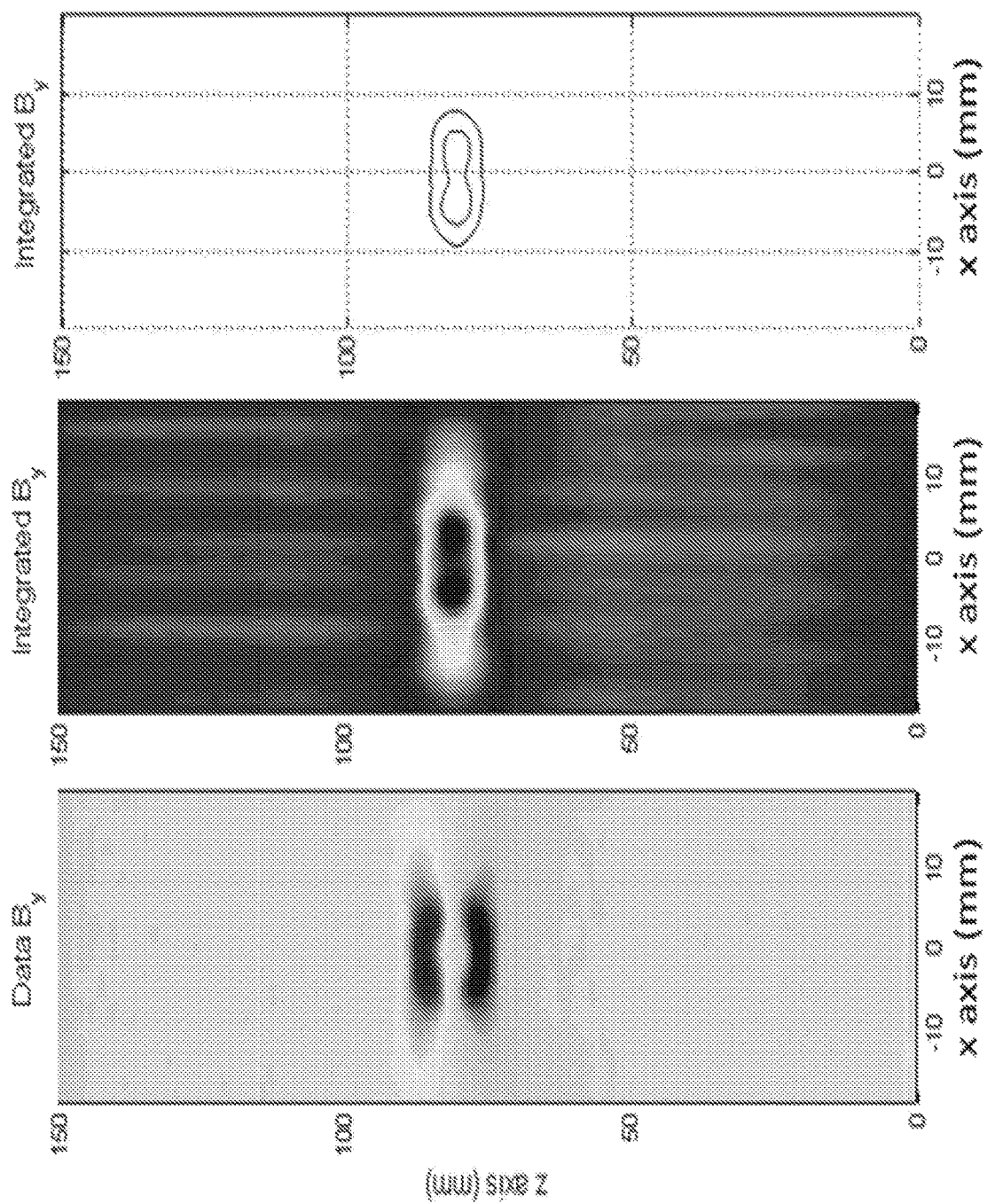
FIGS. 5A-5C depicts processing of raw data with the method of analytical magnetic field continuation and extrapolation: (a) the extrapolated $B_y$ field at zero liftoff, (b) axially integrated extrapolated $B_y$ field and (c) 50% and 30% equi-flux lines derived from integrated $B_y$.

To remove the pepper-and-salt type noise in the data, the data may be pre-processed with a median filter and a low pass filter in the frequency domain. The filtered data was then analytically continued to 5 outer planes at the liftoff values of 4.46 mm, 5.33 mm, 6.19 mm, 7.06 mm, and 7.92 mm. These 5 sets of analytically continued data were then extrapolated to zero liftoff location, exactly at the surface of the steel plate, and the corresponding image of $B_y$ field is presented in FIG. 5(a). Compared to the original data shown in FIG. 3, this extrapolated image is significantly sharpened and is much more focused. Since the $B_y$ field, along the z axis, has peaks corresponding to the horizontal boundaries of the defect, the integrated data depict the defect shape. The axially integrated $B_y$ image is shown in FIG. 5(b) and the contour lines for 50% and 30% of the peak value of the axially integrated $B_y$ field are shown in FIG. 5(c). Both the integrated $B_y$ image and the contour line plot clearly reflect the shape of the circular defect in the steel plate.

Data Filtering Through Regularized Deconvolution

The usual way to circumvent the difficulty associated with the exponentially growing deconvolution filter is to have a built-in safeguard against division by exponentially small numbers. A robust and stable deconvolution inversion filter for the magnetic flux leakage data can be derived by minimizing the following cost function:

$$C[F(\omega)]=\lambda[\int_{-\infty}^{\infty} d\omega |G(\omega,\xi_0)F(\omega)-F(\omega,\xi_0)|^2 - N]+\int_{-\infty}^{\infty} d\omega |F(\omega)|^2 \quad (6)$$

where the scalar factor $\lambda$ ($\lambda>0$) is a Lagrangian multiplier which represents a trade-off parameter determining the relative importance of the data misfit and the regularization term, and N is the spectral noise associated with the data $F(\omega,\xi_0)$. The minimum of the cost function is achieved if:

$$F(\omega) = \frac{G^*(\omega, \xi_0)}{\alpha + |G(\omega, \xi_0)|^2} F(\omega, \xi_0), \quad (7)$$

where the superscript * indicates conjugation and the selection of $\alpha=1/\lambda$ depends on the data noise level and sensor liftoff value. Thus, the deconvolution filter is given as:

$$\Gamma(\omega) = \frac{G^*(\omega, \xi_0)}{a + |G(\omega, \xi_0)|^2} \quad (8)$$

Compared with equation (4), the new deconvolution filter includes a non-zero regularization constant $\alpha$ which stabilizes the deconvolution process.

Figure 6:
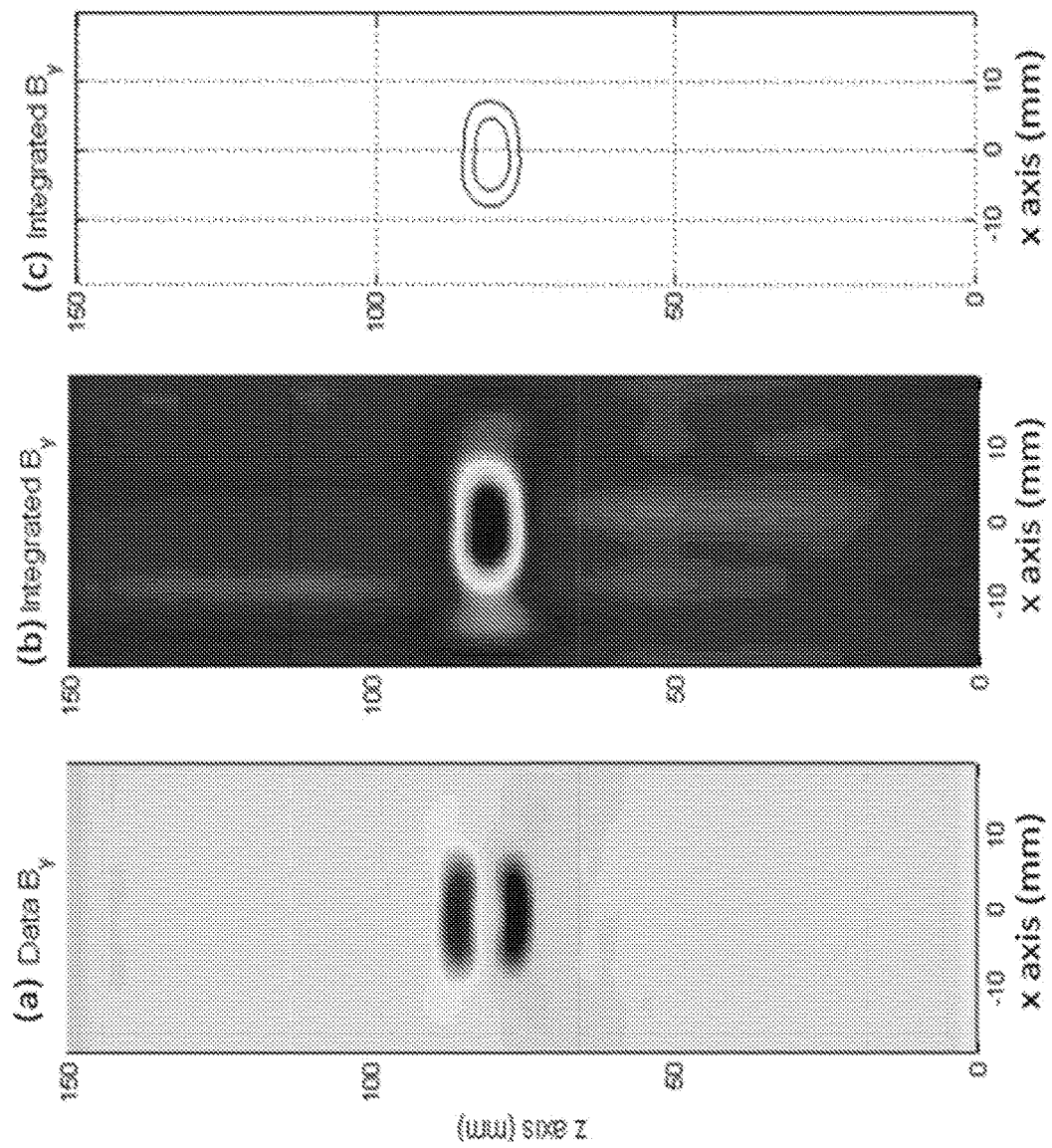
FIG. 6 depicts processing of raw data with data filtering through regularized deconvolution: (a) the extrapolated $B_y$ field at zero liftoff, (b) axially integrated extrapolated $B_y$ field and (c) 50% and 30% equi-flux lines derived from integrated $B_y$.

FIG. 6 shows the processed results of the same experimental magnetic flux leakage data of FIG. 4 with the newly derived deconvolution filter of equation (8) through the regularized output least-squares formulation. The deconvoluted $B_y$ magnetic field flux density is shown on the left. Again, the axially integrated deconvoluted $B_y$ magnetic field flux density is shown in the middle in FIG. 6. The image on the right side is a contour line plot of the axially integrated $B_y$. Both the integrated $B_y$ image and the contour line plot show the circular defect more clearly than the original data.

As described above, embodiments of the present disclosure include a method of analytical field continuation and extrapolation for magnetic flux leakage data and image processing to remove the sensor liftoff effect. Embodiments may further include a method of data filtering through regularized deconvolution for magnetic flux leakage data and image processing to remove the sensor liftoff effect.

Embodiments of the present disclosure may further include a method for interpreting magnetic flux leakage data. The approach may include acquiring magnetic flux leakage data, applying a model-based parametric inversion approach to the data, and determining a shape and size of a corresponding corroded area.

In some embodiments, the present disclosure may utilize a model-based inversion approach for the quantitative interpretation of the magnetic flux leakage data. This may include the use of all the available measured magnetic field components jointly to reconstruct the defect size and shape. Embodiments may also include an approximate method to efficiently simulate the magnetic flux leakage tool responses to pits and holes, which makes the model-based inversion fast and efficient.

Embodiments may include using a model-based parametric inversion to process the measured flux leakage magnetic field data and accurately determine the actual shape and size (radial depth) of the corroded area. Since efficient forward modeling is needed for inversion, embodiments may include an approximate but efficient method to calculate the response of magnetic flux leakage sensor.

In some embodiments, the flux leakage measurements may use a permanent magnet or electromagnet, aligned with the tool and pipe axis, to excite an axial magnetic field component saturating the pipe. The magnetic flux leakage from the pipe is then measured to identify the defect. For a small local corroded area or defect, one may assume the magnetic field in the pipe ($B_s$) to be constant. This constant axial magnetic field gets disturbed by the defect and creates a secondary local magnetic field (flux leakage).

Figure 7:
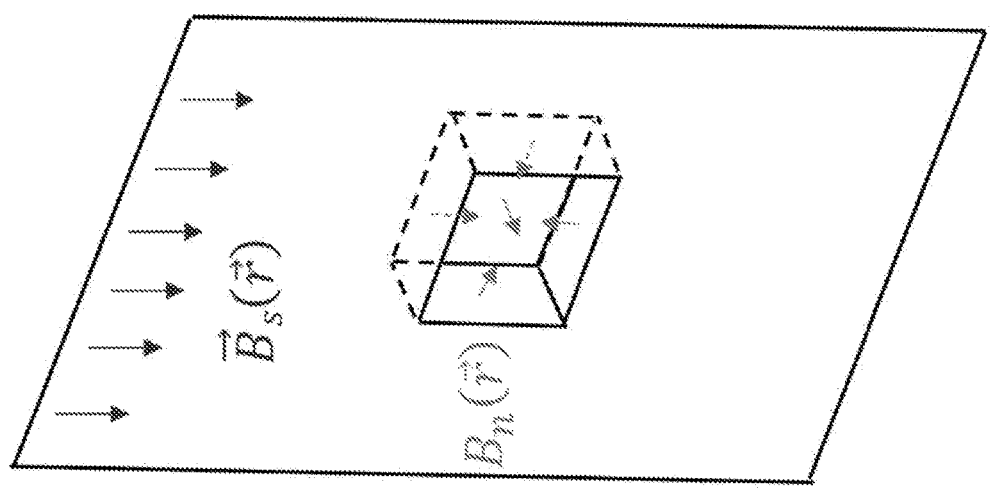
FIG. 7 shows an example of a pit model in accordance with embodiments of the present disclosure.

As shown in FIG. 7, this secondary magnetic field can be approximated as if it were due to "induced magnetic charges", namely the normal (radial) component of the magnetic flux density vector $B_n(r)$, on the surface of the corroded area. Note that some embodiments may model the corroded area as polygonal and show a rectangular pit as in FIG. 7. Note also that this rectangular polygon pit example has five polygonal surfaces, with each surface having a different normal component $B_n(r)$ as marked by the arrows. The normal flux vector components can be numerically solved using a surface integral equation $$B_n(r) - 2\frac{\kappa-1}{\kappa+1} \int_s dS' \{\hat{n}' \cdot \nabla' g(r, r')\} B_n(r') = \frac{2\kappa}{\kappa+1} \hat{n} \cdot B_s, \quad (9)$$

where $\kappa$ is the relative magnetic permeability of the steel pipe. To solve the surface integration equation (9) numerically, embodiments may discretize the defect area with polygons and form a linear system which is easily solved. Once the distribution of the normal components of the magnetic flux density vector $B_n(r)$ on the surface of the corroded area are solved, the leaked magnetic flux at the flux sensor locations due to the defects can be calculated by performing integration over the corroded surface:

$$B(r) = -\frac{\kappa-1}{\kappa} \nabla \int_s dS' g(r, r') B_n(r'). \quad (10)$$

The numerical method for calculating the magnetic flux leakage response outlined above avoids the expensive full field simulation of the permanent magnet in the presence of a corroded steel casing. Instead, we assume a constant axial magnetic flux density $B_s$ in the tubular wall. Embodiments may also assume a linear relationship between the magnetic field intensity and the magnetic flux density. In some embodiments, the magnetic normal flux vector component $B_n(r)$ may be restricted to the corroded surface in equation (9). Thus, the integration in equation (10) would also be limited to the corroded area. These approximations are quite reasonable and make it possible to efficiently simulate the magnetic flux leakage tool response. They also form the foundation for the interpretation of flux leakage measurement data through model-based inversion.

In some embodiments, and with the efficient forward solver disclosed above, parametric model-based inversion can be employed to determine the geometry of the defect anomaly by fitting the measured data with the modeled response. The inversion could be based on the Gauss-Newton optimization approach with box-parameter constraints and a line-search scheme. See Habashy, T., and Abubakar, A., 2004, A General Framework for Constraint Minimization for the Inversion of Electromagnetic Measurements, Progress In Electromagnetics Research, 46, 265-312. The cost function includes the data misfit and a multiplicative regularization term, defined as:

$$C(m) = \tfrac{1}{2} |s(m) - d|^2 + \lambda_k |m - m_p|^2, \quad (11)$$

where m is the vector of unknown model parameters. It contains the 2-D coordinates of the vertices of the pit, the radial depth of the pit, and the sensor liftoff (the gap that inevitably exists between the magnetic sensor and the pipe wall). The pit geometry can be assumed to be circular elliptical, square or diamond, corresponding to different model parameterization. The vector s(m) is the simulated data for the model m, and d represents the measured data vector. The data d are acquired in the zone of the pit with predefined vertical sampling rate using azimuthally distributed magnetic sensors, that can measure up to three components of the magnetic field. The vector $m_p$ represents the reference (prescribed) parameter values, which can also be the parameter values in the previous iteration. The scale variable $\lambda_k(>0)$ is the multiplicative regularization coefficient at the k-th Gauss-Newton iteration, proportional to the data misfit of the k-th iteration.

Figure 8B:
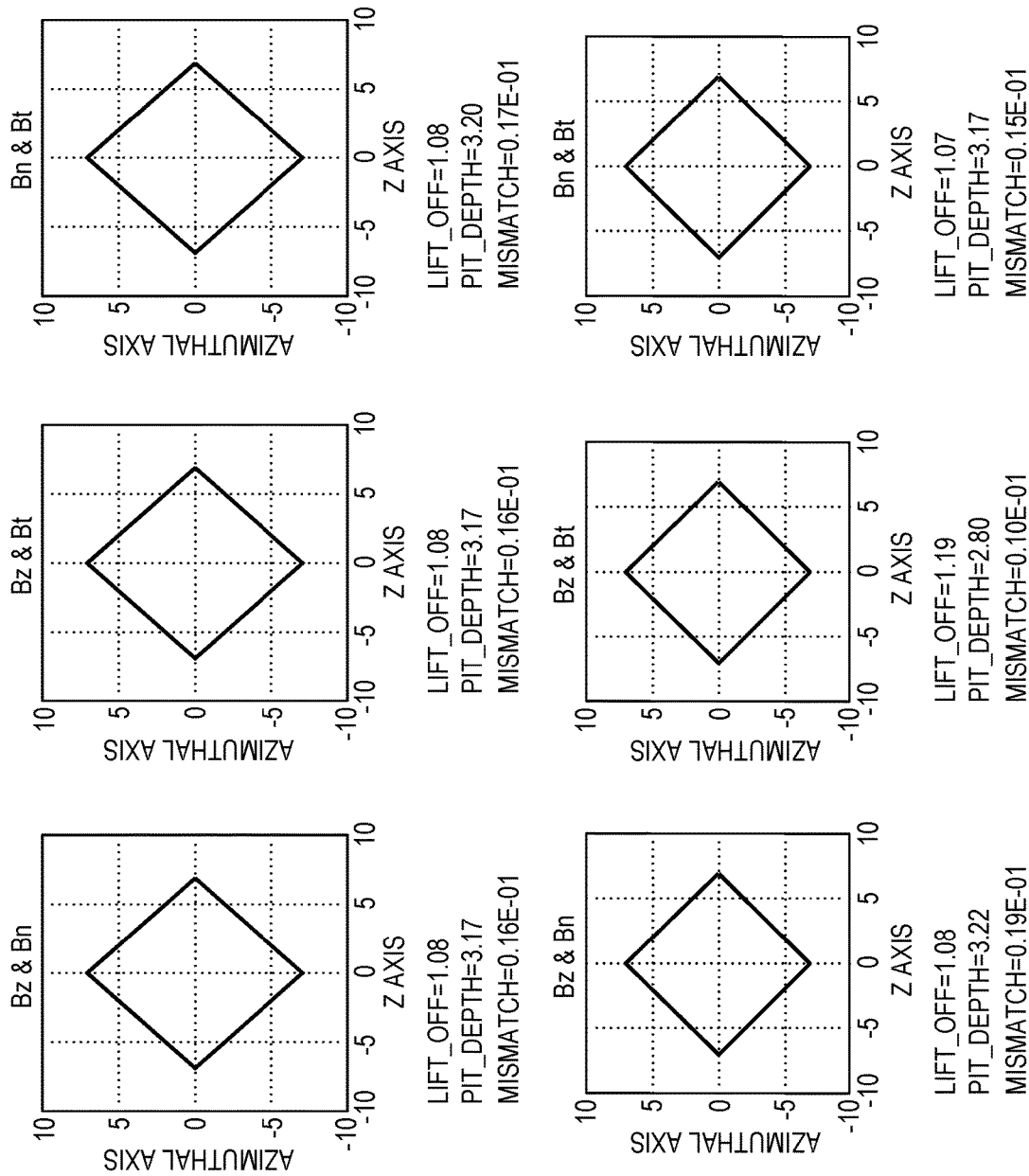
FIG. 8 shows an example of model-based inversion test results for a diamond-shaped pit under various scenarios in accordance with embodiments of the present disclosure.

FIG. 8 shows the results of the inversion experiments carried out for a diamond-shaped pit on the surface of a steel plate. Plotted in the sub-figures are the inverted locations (vertices) of the 4-node polygonal pit in the test cases using different combinations of data and sampling rates. The figures in the top row show inversion results using densely sampled magnetic field data (1 mm in depth and azimuth sampling rate) while in the bottom row are the results using more realistic sampling rate of existing flux leakage tools, 2.5 mm in depth by 5 mm in azimuthal direction. The "Input data" magnetic field indicates the used measurements, the different magnetic flux density components. Here Bz, Bn, and Bt denote the measured axial, normal, and azimuthal magnetic flux density components. The inverted liftoff, pit depth, and the final data mismatch are listed at the bottom of each test case. The true liftoff and the pit depth values are 1 mm and 3 mm, respectively, and the side length of the diamond pit is 10 mm. Thus, the vertices of the diamond are at (−7.07, 0), (0, 7.07), (7.07, 0), and (0, −7.07) millimeters.

As one might observe from the inversion results, the measurements are shown to be sensitive to the location of the pit vertices since it is possible to successfully reconstruct the coordinates of the pit vertices for all the different test cases. A high sampling rate and the use of at least the radial and axial magnetic field measurements are shown to be critical since the inversion test cases at the lower sampling rate (2.5 mm by 5 mm) failed when only a single field component data is used. Therefore, high resolution data sampling is desired for magnetic flux leakage imaging. The results show that the use of multiple magnetic field components helps increase the data sensitivity to the pit and improves the pit imaging.

These observations are further validated by the results of more inversion test cases, shown in FIG. 9, where the sensitivity to pit depth is tested for the same diamond shape. In all the test cases, the vertices of the pit are always correctly inverted. The triplets in the result fields show the inverted liftoff, pit depth, and the residual cost. The model parameters that did not converge are indicated in brackets. As expected, the inversion fails when the pit depth is small, e.g., at 1 mm, where the measurement lacks sensitivity. The results also clearly show that the azimuthal magnetic field component contribution is small as it is least sensitive to the pit.

Figures 10, 10A, 10B:
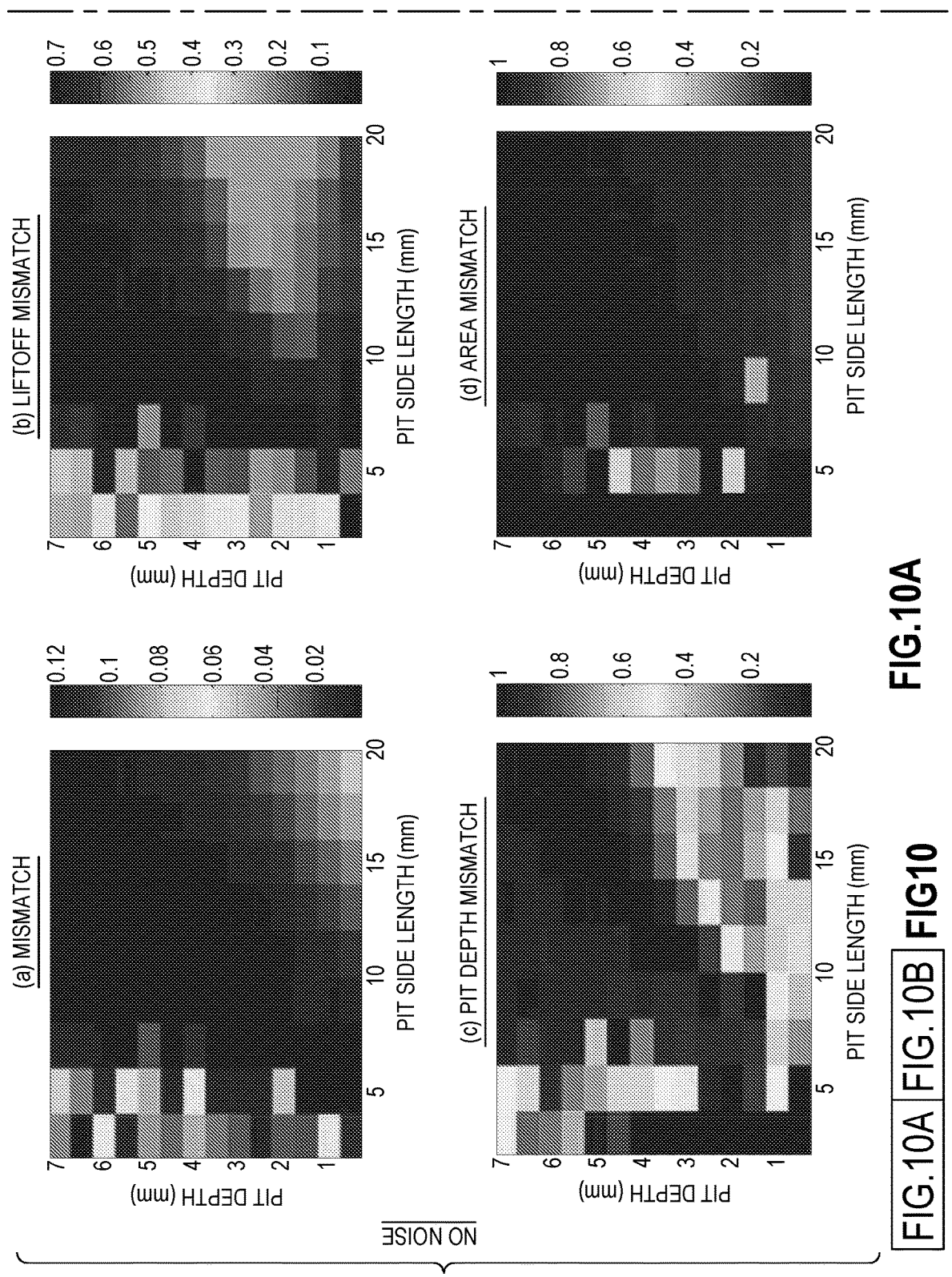
FIG. 10 shows inversion results dependence on varying pit depth and varying length of the pit side: (a) relative residual cost (mismatch); (b) relative liftoff error; (c) relative pit depth error; and (d) pit area relative error in accordance with embodiments of the present disclosure.
Figure 10B:
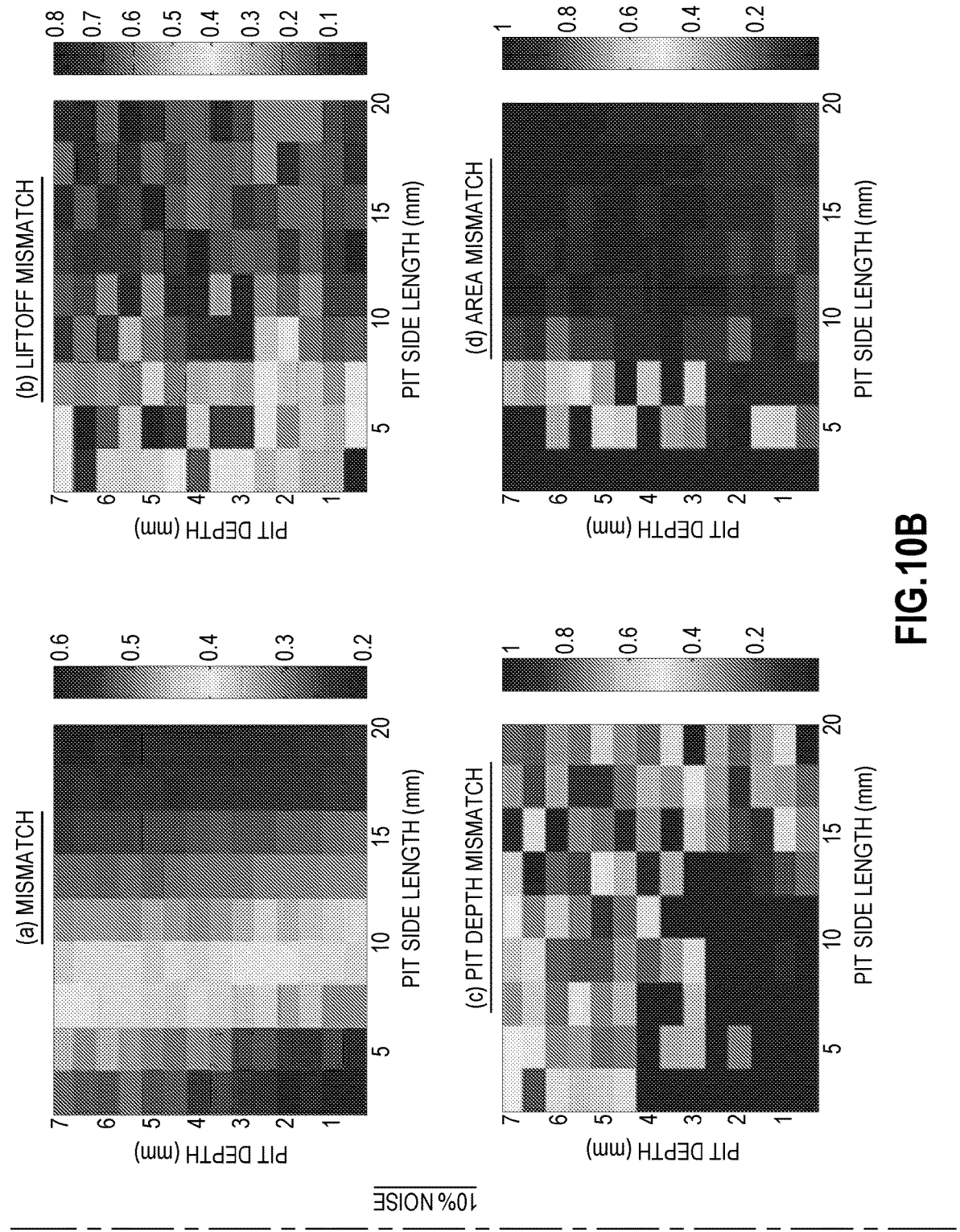

FIG. 10 examines measurement sensitivity as a function of the pit depth (vertical axis) and the length of pit side (horizontal axis). The test is also for diamond-shaped pits, but with a 4 mm liftoff. The measured data used are the normal and axial magnetic flux density components. Shown in the figures are (a) the relative residual cost (mismatch), (b) the relative liftoff error, (c) the relative pit depth error, and (d) the pit area relative error. The two-dimensional images suggest that, for the given 2.5 mm (axial) by 5 mm (azimuthal) sampling rate, it is difficult to invert for pit with a side length less than 5 mm even with noise-free data. Again, the measurements are shown to be sensitive to the pit shape. The data is seen to be more sensitive to liftoff than the pit depth, the two of which are, in fact, not independent of each other in term of measurement sensitivity. The flare-up of mismatch in the bottom-right corner (for large side length and shallow pit depth) is due to insufficient aperture in the data coverage.

It should be noted that the actual corrosion shapes are much more complex than the idealized pit models used in the analysis above. A more sophisticated pit model could align the vertices on a fixed and known 2-D lattice. With the coordinates of the vertices known, one only needs to invert for the individual pit depth at each vertex. In addition, it is possible to use the analytical continuation derived shape as an initial guess of the corroded shape.

Embodiments of the present disclosure include an approximate and efficient method for magnetic flux leakage modeling. Embodiments may include a parametric model-based inversion to process magnetic flux leakage data (e.g., using up to three components of magnetic field measurements) for corrosion applications to determine the shape and depth of the corroded area. Inverted parameters may include, but are not limited to, coordinates of nodes of polygon defining the defect, depth of defect, lift-off—distance from sensor to the casing surface, etc. Embodiments may include a combined workflow using image post-processing using analytical continuation or filtering to obtain the corrosion shape and inversion to obtain the depth, or depth/shape and liftoff.

It is specifically intended that the claimed combinations of features not be limited to the implementations and illustrations contained herein but include modified forms of those implementations including portions of the implementations and combinations of elements of different implementations as come within the scope of the following claims. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

It will also be understood that, although the terms first, second, etc. may be used herein to describe various elements, these elements should not be limited by these terms. These terms may be used to distinguish one element from another. For example, a first object or step could be termed a second object or step, and, similarly, a second object or step could be termed a first object or step, without departing from the scope of the disclosure. The first object or step, and the second object or step, are both objects or steps, respectively, but they are not to be considered a same object or step.

The flowchart and block diagrams in the figures illustrate the architecture, functionality, and operation of possible implementations of systems and methods and according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments and is not intended to be limiting of the disclosure. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Although a few example embodiments have been described in detail above, those skilled in the art will readily appreciate that many modifications are possible in the example embodiments without materially departing from the scope of the present disclosure, described herein. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

Some of the methods and processes described above, can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general-purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Having thus described the disclosure of the present application in detail and by reference to embodiments thereof, it will be apparent that modifications and variations are possible without departing from the scope of the disclosure defined in the appended claims.

The invention claimed is:

1. A method of improving flux leakage data to remove a sensor liftoff effect comprising:
   measuring, using a magnetic flux leakage tool, magnetic flux leakage data from a casing;
   determining sensor liftoff data from the magnetic flux leakage data;
   performing outward analytic continuation of the magnetic flux leakage data from a sensor plane to one or more additional planes; and
   extrapolating back from the one or more additional planes to a surface; wherein extrapolating back includes a linear extrapolation approach.

2. The method of claim 1, wherein extrapolating back includes a polynomial extrapolation approach.

3. The method of claim 1, further comprising:
   determining a magnetic field distribution at zero liftoff.

4. The method of claim 1, further comprising:
   integrating a normal component of a magnetic field to determine a shape of a defect.

5. The method of claim 4, further comprising:
   displaying the shape of the defect for interpretation.

6. The method of claim 1, further comprising:
   applying a deconvolution inversion filter to the magnetic flux leakage data.

7. A system for correcting magnetic flux leakage data to remove a sensor liftoff effect comprising:
   a magnetic flux leakage tool including a sensor and at least one processor configured to:
   measure, using the magnetic flux leakage tool, magnetic flux leakage data from a casing;
   determine sensor liftoff data from the magnetic flux leakage data;

perform outward analytic continuation of the magnetic flux leakage data and the sensor liftoff data from a sensor plane to one or more additional planes; and extrapolate back from the one or more additional planes to a surface; wherein extrapolating back includes a linear extrapolation approach.

8. The system of claim 7, wherein extrapolating back includes a polynomial extrapolation approach.

9. The system of claim 7, further comprising:
determining a magnetic field distribution at zero liftoff.

10. The system of claim 7, further comprising:
integrating a normal component of a magnetic field to determine a shape of a defect.

11. The system of claim 10, further comprising:
displaying the shape of the defect for interpretation.

12. The system of claim 7, further comprising:
applying a deconvolution inversion filter to the magnetic flux leakage data.

* * * * *